No. 694,088. Patented Feb. 25, 1902.
E. G. BOWMAN.
AGRICULTURAL IMPLEMENT.
(Application filed July 11, 1901.)
(No Model.)
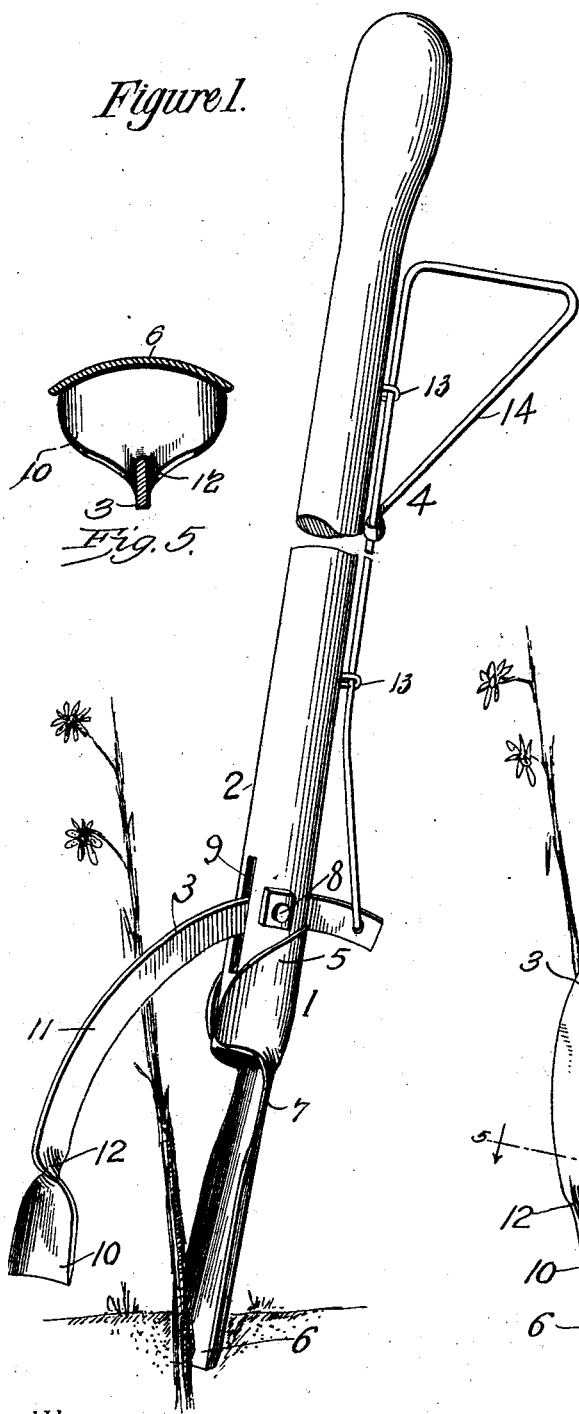
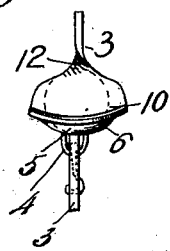
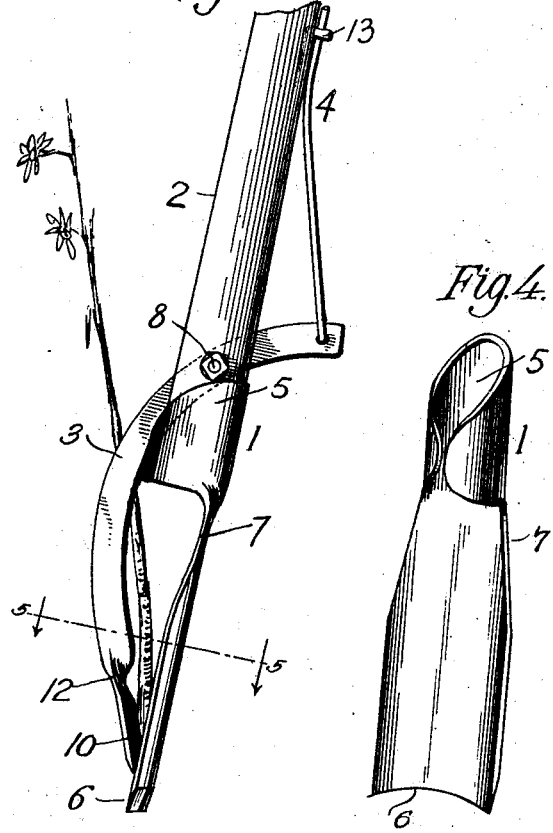
E. G. Bowman, Inventor

UNITED STATES PATENT OFFICE.

ERIC G. BOWMAN, OF MONMOUTH, ILLINOIS.

AGRICULTURAL IMPLEMENT.

SPECIFICATION forming part of Letters Patent No. 694,088, dated February 25, 1902.

Application filed July 11, 1901. Serial No. 67,928. (No model.)

*To all whom it may concern:*

Be it known that I, ERIC G. BOWMAN, a citizen of the United States, residing at Monmouth, in the county of Warren and State of Illinois, have invented a new and useful Agricultural Implement, of which the following is a specification.

The invention relates to agricultural implements, and particularly to a garden-tool adapted for removing dandelion, plantain, and other plants or weeds from a lawn by severing the stalks thereof at a point close to but below the surface of the soil in order that the life of the plant may be destroyed without upturning or destroying the appearance of the surface; and a further object of the invention is to provide a device of this class whereby the severed top of the plant is grasped to permit the same to be conveyed to a receptacle without necessitating the manual grasping thereof by the operator and without necessitating a subsequent collecting operation, such as raking.

Further objects and advantages of the invention will appear in the following description when considered in connection with the accompanying drawings, wherein similar reference characters represent corresponding parts in all the figures, and the novel features thereof will be particularly pointed out in the appended claims, it being understood that various changes in the form, proportion, size, and minor details of construction may be resorted to without departing from the spirit or sacrificing any of the advantages of the invention.

In the drawings, Figure 1 is a perspective view of a preferred embodiment of my invention. Fig. 2 is a side view of the same, showing the movable jaw in its closed position. Fig. 3 is an end view of the jaws as seen when closed. Fig. 4 is a detail view in perspective of the head detached. Fig. 5 is a detail sectional view through the jaw on the plane indicated by the line 5 5 of Fig. 2.

The implement embodying the invention consists, essentially, of a head 1, having a handle or shaft 2 attached thereto, a pivotal jaw 3, mounted for coöperation with the head, and operating means 4 for the movable jaw.

It is desirable in an implement of this class to construct a head of comparatively restricted lateral dimensions, so that the projection laterally beyond the line of the shaft or handle 2 may be small to avoid obstructing the view of the operator and enable the latter to accurately direct the operative edge or extremity of the tool. Hence in practice it is preferred to provide the head with a handle-socket 5 and form the cutting-jaw 6 as a continuation of the socket and in approximate alinement therewith, the lateral edges of the jaw projecting but slightly beyond the corresponding walls of the socket. As shown in Fig. 4, the head may be constructed of a single blank of plate metal to provide at an intermediate point a reduced portion 7, forming a neck, beyond which are arranged lateral projecting ears, which when folded or rolled inward constitute the above-described socket for the reception of the extremity of the handle. Also the forward edges of these ears are preferably cut away to allow the holding-jaw 3, which is pivotally mounted by means of the bolt 8 in a slot 9 of the handle, to swing downward therebetween. Thus when the movable jaw is in its lowered or closed position, as shown in Fig. 2, that portion of the same which is in the slot of the handle lies between the adjacent edges of the ears forming the socket to enable the ears to resist any lateral strain which may be applied to the movable jaw, and thus prevent the splitting of the handle. It is preferred to flatten the blade or cutting-jaw slightly below the socket 5; but a curved contour is preserved to maintain a transversely-concave front face and a correspondingly-convexed rear face, said blade terminating in a curved cutting edge, which is adapted in the use of the implement to be forced into the soil to a point slightly below the surface thereof in order to sever the stalk of the plant or weed just below the surface, this operation usually having the effect of destroying the life of the plant.

The coöperating element of the implement, consisting of the movable jaw 3, is provided with a blade portion 10, which corresponds in width with the blade portion of the head 1 and is provided with a convexed inner rear face and a correspondingly-curved lower edge which agrees with the curvature of the forward or inner face of the blade 6 and is adapted when said movable jaw is in its closed position to fit snugly and evenly against the inner face of the blade 6 at a point slightly above the cutting edge thereof, as indicated in Fig. 2. Preferably the movable jaw is constructed of a blank of metal struck from a plate, with a reduced portion or stem 11, which is disposed with its width perpendicular to that of the blade portion 10, a quarter-twist being formed at 12 to provide for this relative arrangement of parts. The object in thus arranging the stem of the movable jaw is twofold—namely, first, to give the operator a comparatively unobstructed view of the operative end of the cutting-blade 6, and, second, to arrange the strength of the stem in the plane of strain when the implement is in use. The stem, moreover, is curved or of arcuate form to dispose the broadened extremity 10 in a downwardly-convergent relation with the blade 6 when the parts are in a closed position, as indicated in Fig. 2, the only point of approach being the lower extremity of the portion 10, whereby there is a parallel widening space from this point of contact to provide for the reception of the portion of the engaged plant above the point of severance. Hence when the stalk of the plant has been cut the upper portion thereof is retained between the holding-jaw 3 and the cutting-jaw 1, and the operator is enabled to lift the severed portion and deposit it in a basket or other suitable receptacle, thus avoiding the necessity, as with other devices of this class, of dropping the severed portion and subsequently gathering the same by means of a rake or its equivalent. The extremity of the stem 11, which projects rearwardly beyond the shaft 2, is connected with an operating device consisting in the construction illustrated of a slide-rod extending through a guide 13 and having a terminal grip 14, arranged near the upper or grip end of the handle.

In operation the movable jaw, which will remain either in its open or closed position as it may be set by the operator, (no springs or similar device being employed in connection with the implement,) should be thrown back or into an open position, and this enables the operator to direct the cutting end of the blade 6 into the soil at a point adjacent to the stalk of the plant to be removed and at an inclination which will strike the stalk a short distance below the surface of the ground. Having thus adjusted the head, the operating means 4 should be drawn to close the movable jaw into contact with the plant and at the same time the tool should be advanced slightly by pressure on the grip end of the handle to cause the cutting edge of the blade to sever the stalk. The movable jaw may then be held in its closed position while the implement is withdrawn to deposit the plant or weed in the desired receptacle.

While a preferred use of the implement has been described herein, it will be understood that the same may be applied to any other analogous use wherein the two operations of cutting and subsequently handling the severed portion are required, or even when the first-named operation of cutting may be dispensed with, as the tool constitutes a convenient means of pulling small weeds simply by engaging the stalk thereof between the movable jaw and the convexed jaw without resorting to the cutting operation.

Having described the invention, what is claimed is—

1. A garden-tool comprising a slotted handle, a blade curved in cross-section and having at its lower end a transverse cutting edge and at its upper end an integral socket adapted for the reception of the handle, a pivoted jaw having a widened clamping-face of a contour similar to that of the blade and having an integral transversely-reduced stem adapted to pass through the slot in the handle and affording an unobstructed view of the lower end of the blade, a pivot-pin for securing the stem in position in the slot, and an operating-handle connected to the rear portion of said stem, substantially as specified.

2. A garden-tool comprising a head provided at one end with a socket portion consisting of rolled ears of which the extremities are arranged in proximity, a movable jaw having a transversely-reduced stem, a handle fitted in said socket and having a slot in which the stem of the jaw is pivotally mounted, said stem in the closed position of the jaw occupying a position between the upper portions of the ears forming said socket and being laterally supported thereby, and means for actuating the movable jaw.

3. A garden-tool comprising a blade having at its upper end a socket portion consisting of rolled ears of which the extreme end portions are slightly separated, and provided at its lower ends with a sharpened cutting edge 6 adapted to cut the roots of a plant slightly below the surface of the ground, a handle 2 fitted within said socket and having a slot 9, a movable holding-jaw comprising a transversely-reduced stem 11 extending through said slot, a bolt 8 carried by the handle and forming a pivot for said stem, the lower end of said jaw being provided with a widened convex face for engagement with the concaved face of the blade, a slide-rod 4 connected at its lower end to the stem of the movable jaw and having at its upper end a handle or grip 14, and guides 13 carried by the handle for engagement with said slide-rod, substantially as specified.

In testimony that I claim the foregoing as my own I have hereto affixed my signature in the presence of two witnesses.

ERIC G. BOWMAN.

Witnesses:
 FRANK M. WEIR,
 M. M. BOWMAN.